(12) United States Patent
Nakagawa et al.

(10) Patent No.: US 10,187,172 B2
(45) Date of Patent: Jan. 22, 2019

(54) OPTICAL TRANSPORT APPARATUS AND OPTICAL-WAVELENGTH DEFRAGMENTING METHOD

(71) Applicant: FUJITSU LIMITED, Kawasaki (JP)

(72) Inventors: Goji Nakagawa, Sagamihara (JP); Yasuhiko Aoki, Yokohama (JP); Kyosuke Sone, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 168 days.

(21) Appl. No.: 15/431,093

(22) Filed: Feb. 13, 2017

(65) Prior Publication Data

US 2017/0279556 A1  Sep. 28, 2017

(30) Foreign Application Priority Data

Mar. 25, 2016 (JP) ................................ 2016-062794

(51) Int. Cl.
*H04J 14/02* (2006.01)
*H04Q 11/00* (2006.01)
*H04B 10/2575* (2013.01)

(52) U.S. Cl.
CPC ...... *H04J 14/0212* (2013.01); *H04J 14/0256* (2013.01); *H04J 14/0282* (2013.01);
(Continued)

(58) Field of Classification Search
CPC .............. H04J 14/0212; H04J 14/0282; H04J 14/0256; H04Q 11/0067; H04Q 11/0005;
(Continued)

(56) References Cited

U.S. PATENT DOCUMENTS 5,886,802 A * 3/1999 Majima ............... H04J 14/0224
398/196
7,016,608 B1 * 3/2006 Ball ..................... H04J 14/0204
398/58

(Continued)

FOREIGN PATENT DOCUMENTS

JP        2015-154376       8/2015

OTHER PUBLICATIONS

Jun-ichi Kani et al., "Options for future mobile backhaul and fronthaul", Optical Fiber Technology, vol. 26, Part A, Elsevier Inc., Jul. 20, 2015, pp. 42-49.

*Primary Examiner* — Kenneth N Vanderpuye
*Assistant Examiner* — Abbas H Alagheband

(57) ABSTRACT

A processor of an optical transport apparatus is configured to transport an optical multiplexed signal between the optical transport apparatus and a counterpart apparatus by using a plurality of communication units; transmit an arbitrary optical wavelength from the optical multiplexed signal passing through ports by using a wavelength selective switch that has the ports respectively connected to the communication units; control a radio unit in the counterpart apparatus so as to change a frequency of the radio signal in the specified optical wavelength; and change a transmission band of the port through which the optical wavelength passes, according to a change of the frequency of the radio signal. The processor is configured to control an optical transmission unit of the counterpart apparatus so as to change a center wavelength of an optical wavelength passing through the port to a center wavelength of the changed transmission band of the port.

6 Claims, 12 Drawing Sheets

(52) U.S. Cl.
CPC ..... *H04Q 11/0005* (2013.01); *H04Q 11/0067* (2013.01); *H04B 10/25754* (2013.01); *H04J 14/02* (2013.01); *H04J 14/0224* (2013.01); *H04Q 11/00* (2013.01); *H04Q 2011/0016* (2013.01); *H04Q 2011/0037* (2013.01); *H04Q 2011/0064* (2013.01)

(58) Field of Classification Search
CPC ... H04Q 2011/0064; H04Q 2011/0037; H04Q 2011/0016
USPC .......................................................... 398/48
See application file for complete search history.

(56) References Cited

U.S. PATENT DOCUMENTS

| | | | | |
|---|---|---|---|---|
| 7,260,655 | B1* | 8/2007 | Islam | H04Q 11/0005 398/72 |
| 7,548,695 | B2* | 6/2009 | Wake | H04B 10/25754 398/71 |
| 9,125,047 | B2* | 9/2015 | Sundaresan | H04W 16/02 |
| 9,420,359 | B2* | 8/2016 | Cvijetic | H04Q 11/0067 |
| 9,813,786 | B2* | 11/2017 | Cvijetic | H04Q 11/0062 |
| 9,866,327 | B2* | 1/2018 | Shibata | H04B 10/25754 |
| 9,866,347 | B2* | 1/2018 | Sarashina | H04B 10/25754 |
| 10,063,339 | B2* | 8/2018 | Sarashina | H04J 14/0221 14/221 |
| 2012/0263474 | A1* | 10/2012 | Huang | H04B 10/25754 398/93 |
| 2014/0241717 | A1* | 8/2014 | Cvijetic | H04Q 11/0067 398/48 |
| 2016/0261362 | A1* | 9/2016 | Ojima | H04B 10/572 |
| 2017/0063486 | A1* | 3/2017 | Sarashina | H04J 14/0221 |

* cited by examiner

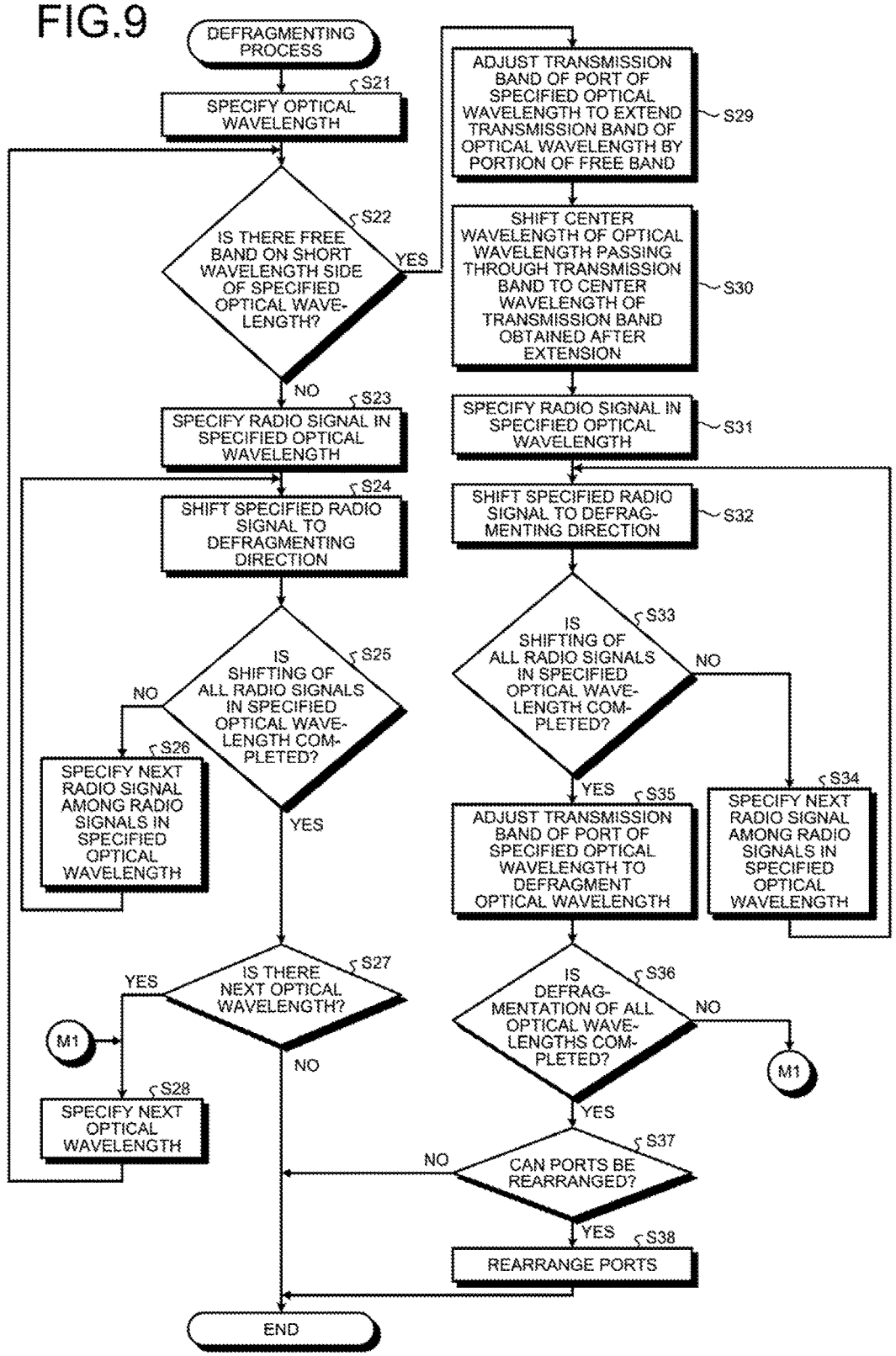

OPTICAL TRANSPORT APPARATUS AND OPTICAL-WAVELENGTH DEFRAGMENTING METHOD

CROSS-REFERENCE TO RELATED APPLICATION

This application is based upon and claims the benefit of priority of the prior Japanese Patent Application No. 2016-062794, filed on Mar. 25, 2016, the entire contents of which are incorporated herein by reference.

FIELD

The embodiments discussed herein are related to an optical transport apparatus and an optical-wavelength defragmenting method.

BACKGROUND

In recent years, it is demanded that base stations have a function of accommodating radio signals in various frequency bands and radio signals having different speed requirements, and performing signal processing on these radio signals at a high speed. Further, in recent years, there is an increasing importance of a radio-optical combination access network efficiently transporting various kinds of radio signals from respective base stations to accommodation stations connected to such as, for example, a metro network. An accommodation station has a built-in optical transport apparatus as an optical line terminating apparatus which optically transports, for example, an optical multiplexed signal accommodating radio signals per optical wavelength.

The optical transport apparatus assigns an optical wavelength to each port in a fixed manner using a fixed wavelength filter (AWG: Arrayed Waveguide Grating) having a plurality of ports, and transmits an optical wavelength assigned to a corresponding port from an optical multiplexed signal passing the ports. As a result, the optical transport apparatus can obtain an arbitrary optical wavelength from the optical multiplexed signal using the AWG, and obtain radio signals in the obtained optical wavelength.

When, in the optical transport apparatus, there occurs a free band in an optical wavelength accommodating radio signals, the utilization ratios of radio resources and optical wavelength resources decrease, resulting in deterioration of the transport efficiency of optical wavelengths. Because the optical transport apparatus uses the AWG, an optical wavelength assigned to each port is fixed, that is, a transmission bandwidth is fixed for each port. As a result, in the optical transport apparatus, it is difficult for the transmission bandwidths assigned to the ports to be changed, and an optical multiplexed signal is transported while the free band occurs in the optical wavelength, resulting in deterioration of the transport efficiency of the optical wavelengths.

SUMMARY

According to an aspect of an embodiment, an optical transport apparatus transports an optical multiplexed signal accommodating a radio signal per optical wavelength. The optical transport apparatus includes a processor. The processor is configured to transport an optical multiplexed signal between the optical transport apparatus and a counterpart apparatus by using a plurality of communication units. The processor is configured to transmit an arbitrary optical wavelength from the optical multiplexed signal passing through ports by using a wavelength selective switch that has the ports respectively connected to the communication units. The processor is configured to control a radio unit in the counterpart apparatus so as to change a frequency of the radio signal in the specified optical wavelength. The processor is configured to change a transmission band of the port through which the optical wavelength passes, according to a change of the frequency of the radio signal. The processor is configured to control an optical transmission unit of the counterpart apparatus so as to change a center wavelength of an optical wavelength passing through the port to a center wavelength of the changed transmission band of the port.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a flowchart illustrating an example of processing operations relating to the defragmenting process in the controller of the accommodation station;

DESCRIPTION OF EMBODIMENTS

Preferred embodiments of the present invention will be explained with reference to accompanying drawings. The disclosed techniques are not limited to the embodiments. The embodiments described below can be combined as appropriate.

[a] First Embodiment

Figure 1:
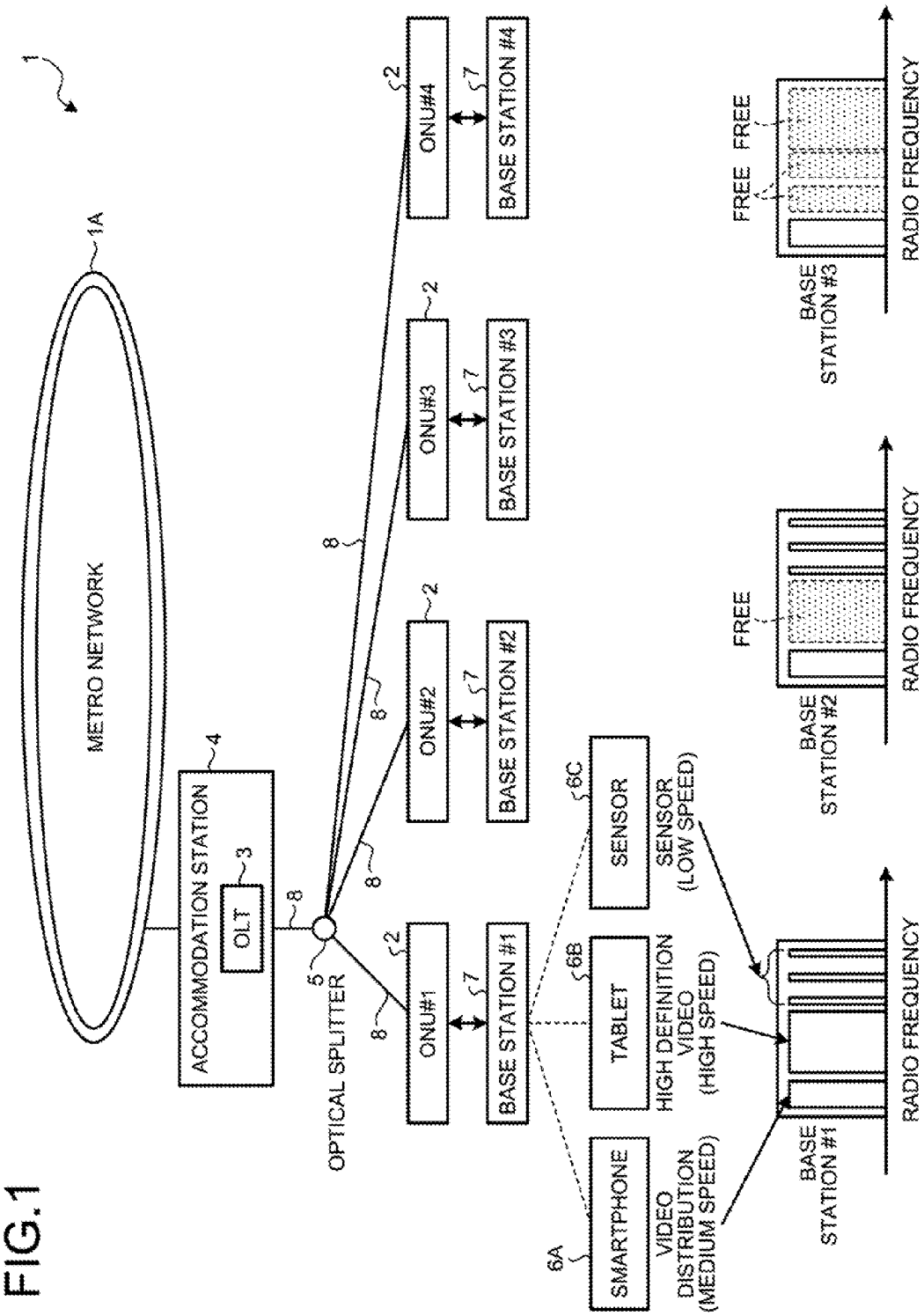
FIG. 1 is an explanatory diagram illustrating an example of an optical transport system according to a first embodiment.

FIG. 1 is an explanatory diagram illustrating an example of an optical transport system 1 according to a first embodiment. The optical transport system 1 illustrated in FIG. 1 has a plurality of optical line terminating apparatuses (ONUs: Optical Network Units) 2 on the subscriber side, an accommodation station 4 having a built-in optical line terminating apparatus (OLT: Optical Line Terminal Unit) 3 on the communication carrier side, and an optical splitter 5. The optical transport system 1 is an optical-radio combination network which combines radio transport with optical transport. The ONU 2 is connected to a base station 7 which wirelessly connects, for example, a smartphone 6A, a tablet 6B, and a sensor 6C of any type. The base station 7 transports, for example, radio signals of medium-speed data, such as video distribution, between the base station 7 and the smartphone 6A. The base station 7 also transports, for example, radio signals of high-speed data, such as high definition video, between the base station 7 and the tablet 6B. The base station 7 also transports radio signals of low-speed data, such as sensor results, between the base station 7 and the sensor 6C. For convenience of explanation, it is assumed that the ONU 2 of #1 is connected to the base station 7 of #1; the ONU 2 of #2 is connected to the base station 7 of #2; the ONU 2 of #3 is connected to the base station 7 of #3; and that the ONU 2 of #4 is connected to the base station 7 of #4. It is also assumed that the base stations 7 of #1 to #4 are located geographically close to each other.

Figure 2:
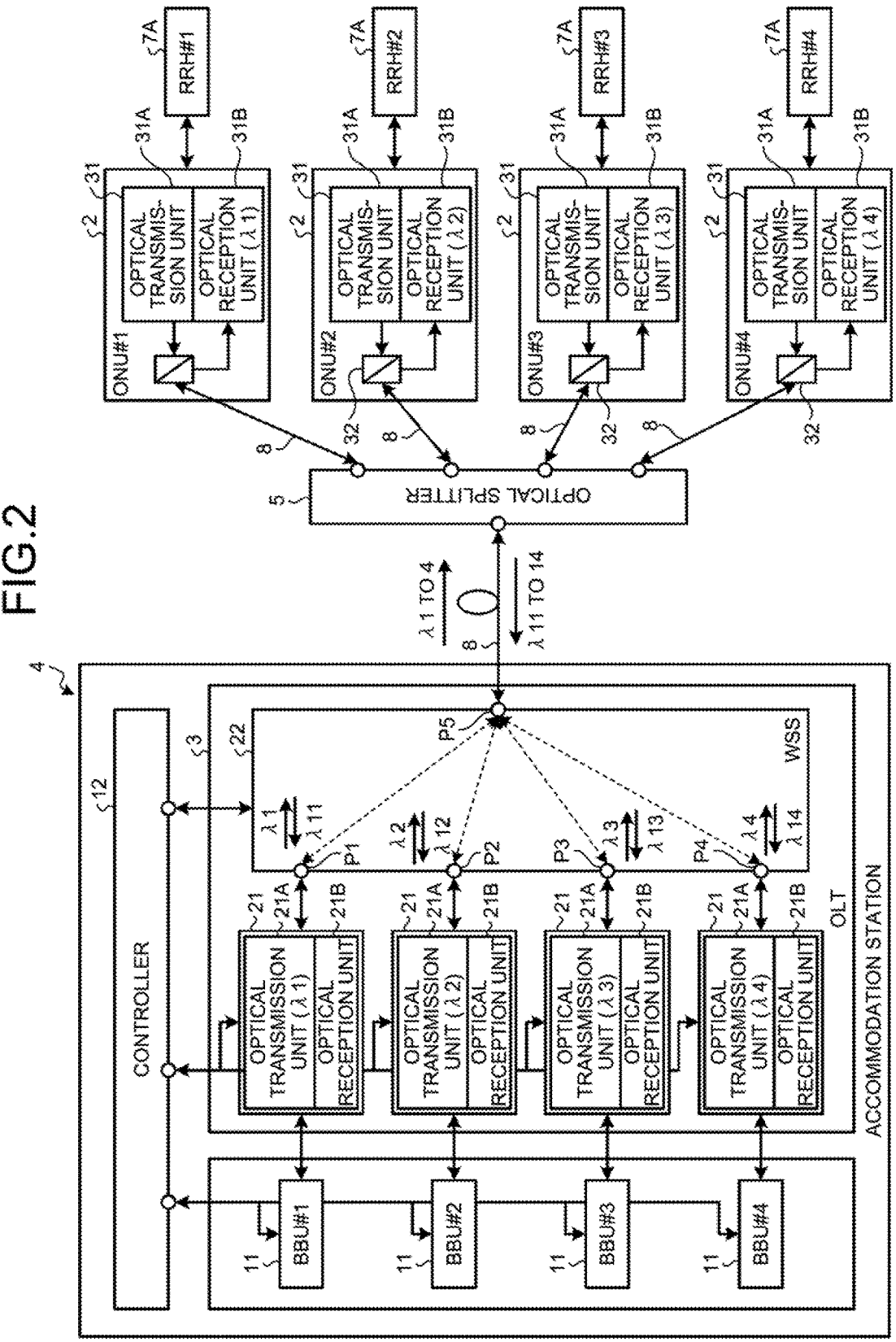
FIG. 2 is an explanatory diagram illustrating an example of the inside of an accommodation station and the inside of an ONU.

The accommodation station 4 is connected to a metro network 1A, for example. Networks connected to the accommodation station 4 are not limited to the metro network 1A, but may also be, for example, a long-distance network or the like. FIG. 2 is an explanatory diagram illustrating an example of the inside of the accommodation station 4 and the inside of the ONUs 2. The accommodation station 4 has a plurality of BBUs (Base Band Units) 11 and a controller 12 as well as the OLT 3. The BBU 11 is a unit which performs baseband processing on radio signals in an optical wavelength. The controller 12 controls the entire accommodation station 4. The OLT 3 is connected to the ONUs 2 with optical fibers 8 which transport an optical multiplexed signal therebetween. The optical multiplexed signal is a signal accommodating and transporting radio signals per optical wavelength. The optical splitter 5 optically branches an optical multiplexed signal from the OLT 3, and also optically multiplexes optical wavelengths from the respective ONUs 2 into an optical multiplexed signal.

The OLT 3 has a plurality of optical communication units 21 and a wavelength selective switch (WSS) 22. The optical communication unit 21 has an optical transmission unit 21A and an optical reception unit 21B. The optical transmission unit 21A enables optical wavelengths in a downstream optical multiplexed signal from the OLT 3 to the ONUs 2 to be variable, and transmits arbitrary optical wavelengths. The optical reception unit 21B receives an arbitrary optical wavelength in an upstream optical multiplexed signal which is transmitted through the ports of the WSS 22 from the ONU 2 to the OLT 3. Although, for convenience of explanation, it is assumed that the number of optical communication units 21 is four, it is not limited to four, but can be changed as appropriate. The WSS is a switch having a plurality of ports P and enabling a transmission band for each port P to be adjusted. The WSS 22 adjusts the transmission band for each port P, thereby assigning an arbitrary optical wavelength to each port P and adjusting the bandwidth of the optical wavelength. The WSS 22 optically branches an arbitrary optical wavelength from a downstream optical multiplexed signal, and also optically multiplexes optical wavelengths from the optical communication units 21 into an upstream optical multiplexed signal.

The WSS 22 connects, for example, the optical communication unit 21 of #1 to a port P1, the optical communication unit 21 of #2 to a port P2, the optical communication unit 21 of #3 to a port P3, and the optical communication unit 21 of #4 to a port P4. For example, the WSS 22 outputs an arbitrary optical wavelength from an optical multiplexed signal to the optical communication unit 21 of #1 through the port P1. The optical transmission unit 21A in the optical communication unit 21 of #1 communicates with an optical reception unit 31B in an optical communication unit 31 in the ONU 2 of #1 at an optical wavelength λ1, and the optical transmission unit 21A in the optical communication unit 21 of #2 communicates with the optical reception unit 31B in the optical communication unit 31 in the ONU 2 of #2 at an optical wavelength λ2. The optical transmission unit 21A in the optical communication unit 21 of #3 communicates with the optical reception unit 31B in the optical communication unit 31 in the ONU 2 of #3 at an optical wavelength λ3, and the optical transmission unit 21A in the optical communication unit 21 of #4 communicates with the optical reception unit 31B in the optical communication unit 31 in the ONU 2 of #4 at an optical wavelength λ4.

The ONU 2 has the optical communication unit 31 and an optical coupler 32. The optical communication unit 31 has the optical transmission unit 31A and the optical reception unit 31B. The optical transmission unit 31A enables an optical wavelength used in an upstream optical multiplexed signal to be variable, and transmits an arbitrary optical wavelength. The optical reception unit 31B receives a downstream optical multiplexed signal. The optical coupler 32 transmits the optical wavelength from the optical transmission unit 31A to the OLT 3, and also transmits the optical multiplexed signal from the OLT 3 to the optical reception unit 31B.

Figure 3:
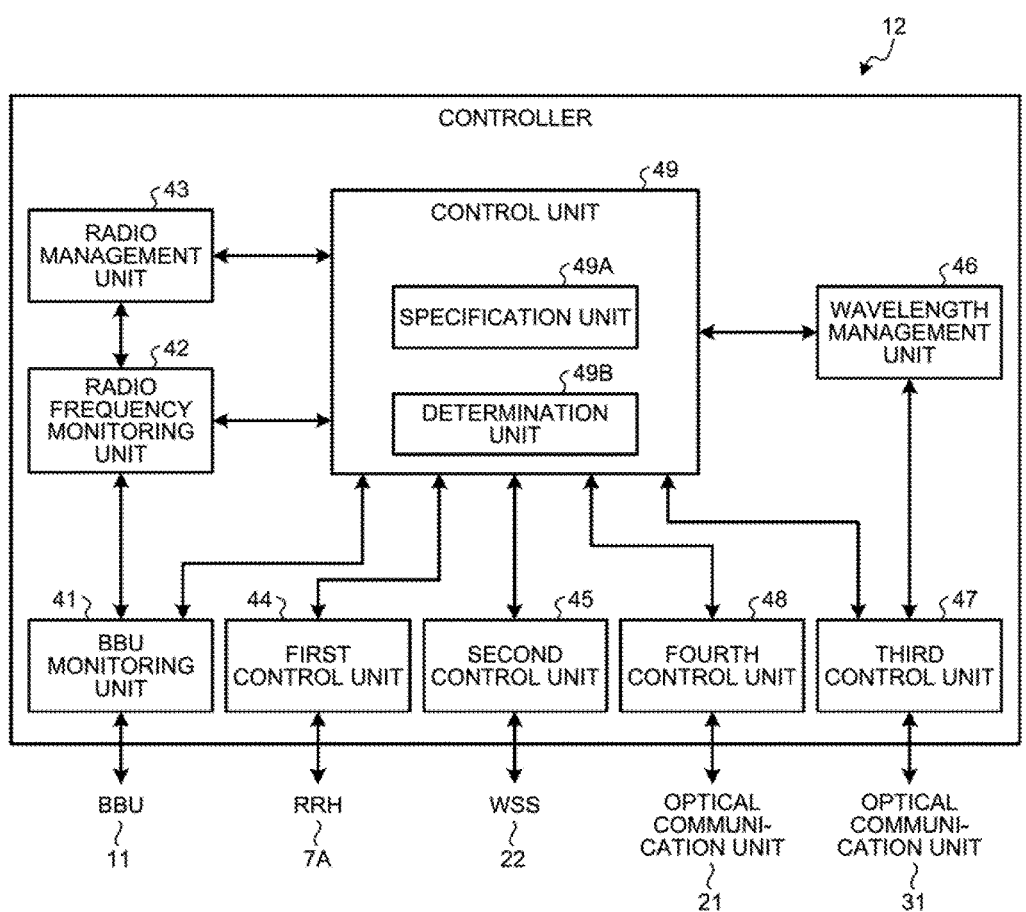
FIG. 3 is a block diagram illustrating an example of a controller inside the accommodation station.

FIG. 3 is a block diagram illustrating an example of the controller 12. The controller 12 illustrated in FIG. 3 has a BBU monitoring unit 41, a radio frequency monitoring unit 42, a radio management unit 43, a first control unit 44, a second control unit 45, a wavelength management unit 46, a third control unit 47, a fourth control unit 48, and a control unit 49.

The BBU monitoring unit 41 monitors the respective BBUs 11. Based on the monitoring results by the BBU monitoring unit 41, the radio frequency monitoring unit 42 monitors the use status of the radio frequencies of radio signals for each base station 7. The radio management unit 43 manages the use status and the reservation status per radio frequency for each radio signal. The use status stores therein an identifier that identifies the presence of use of a corresponding radio frequency. The reservation status stores therein an identifier which identifies the presence of reservation to use a corresponding radio frequency.

The first control unit 44 controls an RRH 7A in the base station 7 which controls radio frequencies of radio signals in an optical wavelength, in order to shift radio signals in a specified optical wavelength to a defragmenting direction, for example, to the low frequency side. The first control unit 44 notifies the RRH 7A in the base station 7 of radio control information for shifting the radio signals to the low frequency side. Based on the radio control information, the RRH 7A shifts the radio frequencies of the radio signals to the low frequency side. It is assumed that the first control unit 44 notifies the RRH 7A of the radio control information in a manner such that the radio control information is arranged in a header portion of an optical multiplexed signal.

The second control unit 45 controls the WSS 22 in order to adjust the transmission bands of the ports P in the WSS 22. The WSS 22 adjusts the transmission band for each port P, and can transmit and output not only an arbitrary optical wavelength from the optical multiplexed signal, but also an optical wavelength with an arbitrary bandwidth.

The wavelength management unit 46 manages the use status per optical wavelength. The third control unit 47 notifies the optical transmission unit 31A in the optical communication unit 31 on the ONU 2 side of optical wavelength control information in order to shift the center wavelength of an optical wavelength. Based on the optical wavelength control information, the optical transmission unit 31A in the optical communication unit 31 shifts the center wavelength of the optical wavelength. It is assumed that the third control unit 47 notifies the optical communication unit 31 on the ONU 2 side of the optical wavelength control information in a manner such that the optical wavelength control information is arranged in a header portion of an optical multiplexed signal.

The fourth control unit 48 controls the optical communication units 21 in the apparatus of its own. For example, the fourth control unit 48 controls the optical communication unit 21 so as to shift the center wavelength of the optical wavelength of the optical transmission unit 21A in the optical communication unit 21, in order to adjust an optical wavelength of a downstream optical multiplexed signal correspondingly to an optical wavelength of an upstream optical multiplexed signal. The control unit 49 controls the entire controller 12. The control unit 49 has a specification unit 49A and a determination unit 49B. The specification unit 49A specifies an arbitrary optical wavelength from an optical multiplexed signal. The determination unit 49B refers to the reservation status of a free frequency band in an optical wavelength, and determines whether the free frequency band is already reserved. When the free frequency band is already reserved, the control unit 49 does not perform a defragmenting process. When the free frequency band is not reserved, the control unit 49 performs the defragmenting process.

Next, operations of the optical transport system 1 according to the first embodiment are explained. FIGS. 4A to 4C, FIGS. 5A to 5E, FIGS. 6A to 6D, and FIGS. 7A to 7D are explanatory diagrams illustrating accommodation statuses of radio signals per optical wavelength relating to a defragmenting process on the accommodation station 4 side. For convenience of explanation, it is assumed that a direction to defragment an optical wavelength is a direction to shift the optical wavelength to the short wavelength side of the optical wavelength, and that a direction to defragment radio signals in the optical wavelength is a direction to shift the radio signals to the low frequency side in the optical wavelength.

Figure 4A:
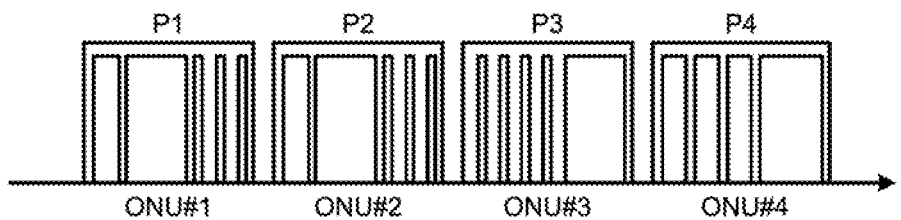
FIG. 4A is an explanatory diagram illustrating an example of accommodation statuses of radio signals per optical wavelength relating to a defragmenting process on the accommodation station.

The accommodation status illustrated in FIG. 4A accommodates, as an initial state, an optical wavelength of the ONU 2 of #1 transmitted through the port P1, an optical wavelength of the ONU 2 of #2 transmitted through the port P2, an optical wavelength of the ONU 2 of #3 transmitted through the port P3, and an optical wavelength of the ONU 2 of #4 transmitted through the port P4. The optical wavelength of the ONU 2 of #1 accommodates radio signals of the base station 7 of #1, and the optical wavelength of the ONU of #2 accommodates radio signals of the base station 7 of #2. In addition, the optical wavelength of the ONU 2 of #3 accommodates radio signals of the base station 7 of #3, and the optical wavelength of the ONU of #4 accommodates radio signals of the base station 7 of #4. Types of radio signals include, for example, high-speed data, middle-speed data, and low-speed data. The control unit 49 monitors the use status of the radio frequency of each radio signal in the optical wavelength based on the monitoring results by the BBU monitoring unit 41, and manages the use status for each radio signal in the radio management unit 43.

Figure 4B:
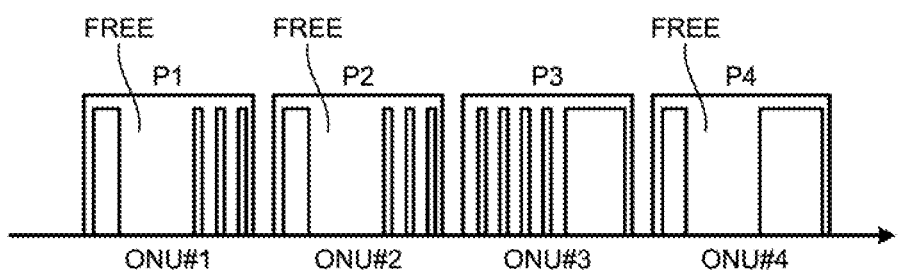
FIG. 4B is an explanatory diagram illustrating an example of accommodation statuses of radio signals per optical wavelength relating to the defragmenting process on the accommodation station.

The accommodation status illustrated in FIG. 4B represents a status in which there occurs a space free from radio signals from the base station 7 of #1 in the optical wavelength of the ONU 2 of #1; there occurs a space free from the radio signal from the base station 7 of #2 in the optical wavelength of the ONU 2 of #2; and there occurs a space free from the radio signals from the base station 7 of #4 in the optical wavelength of the ONU 2 of #4. Based on the monitoring results by the radio frequency monitoring unit 42, the control unit 49 identifies a radio frequency free from a radio signal in the optical wavelength.

Figure 4C:
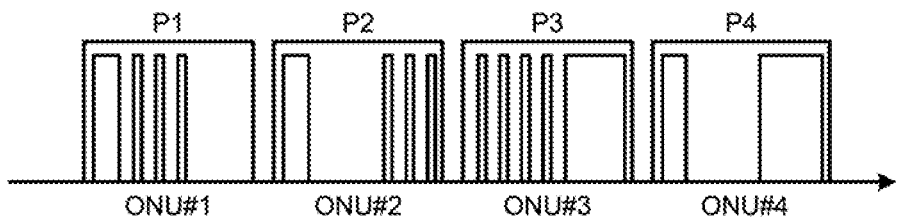
FIG. 4C is an explanatory diagram illustrating an example of accommodation statuses of radio signals per optical wavelength relating to the defragmenting process on the accommodation station.

The first control unit 44 notifies the RRH 7A in the base station 7 of #1 connected to the ONU 2 of #1 of radio control information, in order to defragment radio signals in the optical wavelength of the ONU 2 of #1 in the low frequency direction. Based on the radio control information, the RRH 7A in the base station 7 of #1 shifts the radio signals in the optical wavelength of the ONU 2 of #1 to the low frequency side as illustrated in FIG. 4C. The accommodation status illustrated in FIG. 4C represents a state in which because the radio signals in the optical wavelength of the ONU 2 of #1 have been shifted to the low frequency side, there occurs a free band on the high frequency side in the optical wavelength of the ONU 2 of #1.

Figure 5A:
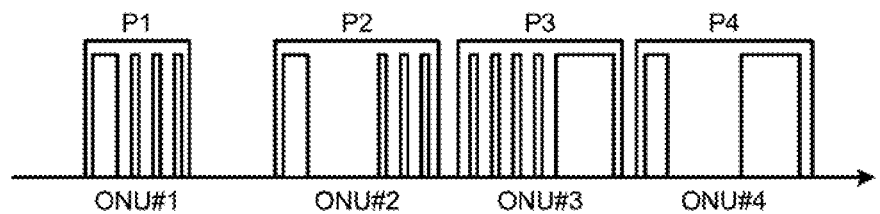
FIG. 5A is an explanatory diagram illustrating an example of accommodation statuses of radio signals per optical wavelength relating to the defragmenting process on the accommodation station.

The second control unit 45 adjusts the transmission band of the port P1 in the WSS 22 in order to defragment the optical wavelength of the ONU 2 of #1 in the short wavelength direction, that is, to remove the free band on the long wavelength side in the optical wavelength of the ONU 2 of #1. The WSS 22 adjusts the transmission band of the port P1, and transmits and outputs the optical wavelength of the ONU 2 of #1 from the port P1 as illustrated in FIG. 5A. The accommodation status illustrated in FIG. 5A represents a state in which because the free band on the long wavelength side in the optical wavelength of the ONU 2 of #1 has been removed, and the optical wavelength of the ONU 2 of #1 has been shifted to the short wavelength side, the optical wavelength of the ONU 2 of #1 is defragmented in the short wavelength direction. As a result, defragmentation of the optical wavelength of the ONU 2 of #1 is completed.

Figure 5B:
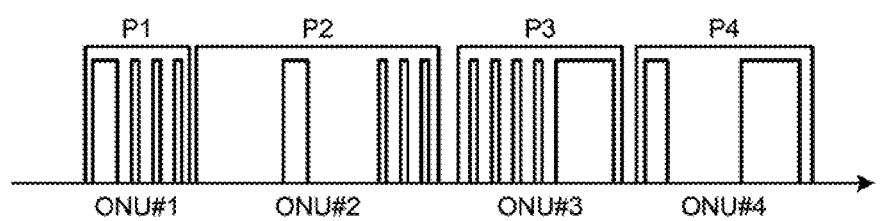
FIG. 5B is an explanatory diagram illustrating an example of accommodation statuses of radio signals per optical wavelength relating to the defragmenting process on the accommodation station.

After completion of defragmenting the optical wavelength of the ONU 2 of #1, the control unit 49 starts defragmenting the optical wavelength of the ONU 2 of #2 having the next shortest wavelength. The second control unit 45 determines whether there is a free band between the optical wavelength of the ONU 2 of #1 and the optical wavelength of the ONU 2 of #2, on the short wavelength side of the optical wavelength of the ONU 2 of #2. If there is a free band on the short wavelength side of the optical wavelength of the ONU 2 of #2, the second control unit 45 adjusts the transmission band of a port P2 in the WSS 22 so as to widen the band on the short wavelength side in the optical wavelength of the ONU 2 of #2 by a portion of the free band. It is assumed that the bandwidth of the optical wavelength of the ONU 2 of #2 obtained after band extension is set to such a degree that the band of the optical wavelength of the ONU 2 of #1 does not overlap. The WSS 22 adjusts the transmission band of the port P2, and transmits and outputs the optical wavelength of the ONU 2 of #2 from the port P2 as illustrated in FIG. 5B. The accommodation status illustrated in FIG. 5B represents a state in which the band on the short wavelength side in the optical wavelength of the ONU 2 of #2 has been extended to be close to the optical wavelength of the ONU 2 of #1.

Figure 5C:
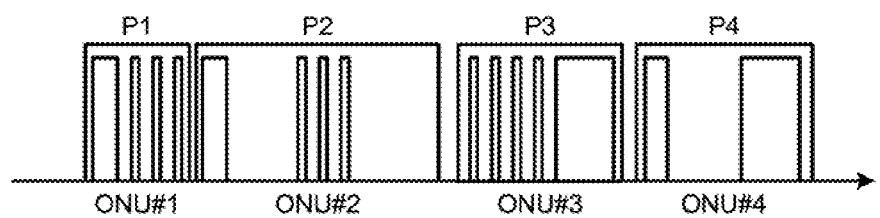
FIG. 5C is an explanatory diagram illustrating an example of accommodation statuses of radio signals per optical wavelength relating to the defragmenting process on the accommodation station.

The third control unit 47 notifies the optical transmission unit 31A of the ONU 2 of #2 of optical wavelength control information in order to shift the center wavelength of the optical wavelength transmitted by the optical transmission unit 31A of the ONU 2 of #2 to the center wavelength of the transmission band obtained after band extension of the port P2. Based on the optical wavelength control information, the optical transmission unit 31A in the ONU 2 of #2 shifts the center wavelength of the optical wavelength correspondingly to the center wavelength of the transmission band obtained after band extension, as illustrated in FIG. 5C. The accommodation status illustrated in FIG. 5C represents a state in which the center wavelength of the optical wavelength from the optical transmission unit 31A of the ONU 2 of #2 has been shifted to the center wavelength of the transmission band obtained after band extension of the port P2.

Figure 5D:
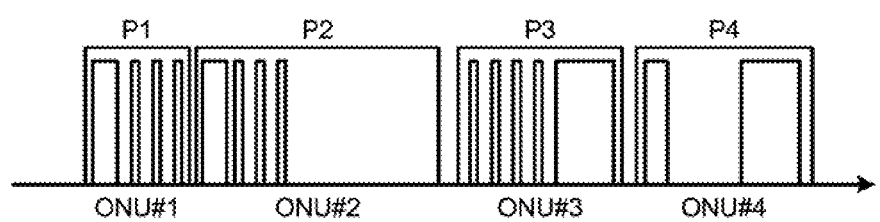
FIG. 5D is an explanatory diagram illustrating an example of accommodation statuses of radio signals per optical wavelength relating to the defragmenting process on the accommodation station.

After the center wavelength of the optical wavelength from the optical transmission unit 31A of the ONU 2 of #2 is shifted, the first control unit 44 notifies the RRH 7A in the base station 7 of #2 connected to the ONU 2 of #2 of radio control information, in order to defragment radio signals in the optical wavelength of the ONU 2 of #2 in the low frequency direction. Based on the radio control information, the RRH 7A in the base station 7 of #2 shifts the radio signals in the optical wavelength of the ONU 2 of #2 to the low frequency side as illustrated in FIG. 5D. The accommodation status illustrated in FIG. 5D represents a state in which because the radio signals in the optical wavelength of the ONU 2 of #2 have been shifted to the low frequency side, there occurs a free band on the high frequency side in the optical wavelength of the ONU 2 of #2.

Figure 5E:
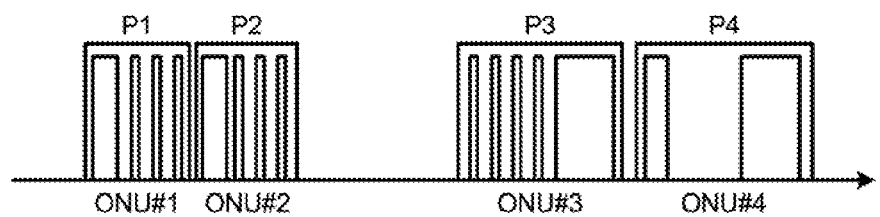
FIG. 5E is an explanatory diagram illustrating an example of accommodation statuses of radio signals per optical wavelength relating to the defragmenting process on the accommodation station.

The second control unit 45 adjusts the transmission band of the port P2 in the WSS 22 in order to defragment the optical wavelength of the ONU 2 of #2 in the short wavelength direction, that is, to remove the free band on the long wavelength side in the optical wavelength of the ONU 2 of #2. The WSS 22 adjusts the transmission band of the port P2, and transmits and outputs the optical wavelength of the ONU 2 of #2 from the port P2 as illustrated in FIG. 5E. The accommodation status illustrated in FIG. 5E represents a state in which because the free band on the long wavelength side in the optical wavelength of the ONU 2 of #2 has been removed, and the optical wavelength of the ONU 2 of #2 has been shifted to the short wavelength side, the optical wavelength of the ONU 2 of #2 is defragmented in the short wavelength direction. As a result, defragmentation of the optical wavelength of the ONU 2 of #2 is completed.

Figure 6A:
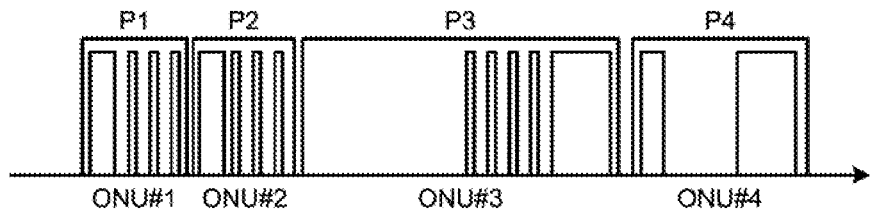
FIG. 6A is an explanatory diagram illustrating an example of accommodation statuses of radio signals per optical wavelength relating to the defragmenting process on the accommodation station.

After completion of defragmenting the optical wavelength of the ONU 2 of #2, the control unit 49 starts defragmenting the optical wavelength of the ONU 2 of #3 having the next shortest wavelength. The second control unit 45 determines whether there is a free band between the optical wavelength of the ONU 2 of #2 and the optical wavelength of the ONU 2 of #3, on the short wavelength side of the optical wavelength of the ONU 2 of #3. If there is a free band on the short wavelength side of the optical wavelength of the ONU 2 of #3, the second control unit 45 adjusts the transmission band of the port P3 in the WSS 22 so as to widen the band on the short wavelength side in the optical wavelength of the ONU 2 of #3 by a portion of the free band. It is assumed that the bandwidth of the optical wavelength of the ONU 2 of #3 obtained after band extension is set to such a degree that the band of the optical wavelength of the ONU 2 of #2 does not overlap. The WSS 22 adjusts the transmission band of the port P3, and transmits and outputs the optical wavelength of the ONU 2 of #3 from the port P3 as illustrated in FIG. 6A. The accommodation status illustrated in FIG. 6A represents a state in which the band on the short wavelength side in the optical wavelength of the ONU 2 of #3 has been extended to be close to the optical wavelength of the ONU 2 of #2.

The third control unit 47 notifies the optical transmission unit 31A of the ONU 2 of #3 of optical wavelength control information in order to shift the center wavelength of the optical wavelength transmitted by the optical transmission unit 31A of the ONU 2 of #3 to the center wavelength of the transmission band obtained after band extension of the port P3. Based on the optical wavelength control information, the optical transmission unit 31A in the ONU 2 of #3 shifts the center wavelength of the optical wavelength correspondingly to the center wavelength of the transmission band obtained after band extension. The accommodation status represents a state in which the center wavelength of the optical wavelength from the optical transmission unit 31A of the ONU 2 of #3 has been shifted to the center wavelength of the transmission band obtained after band extension of the port P3.

Figure 6B:
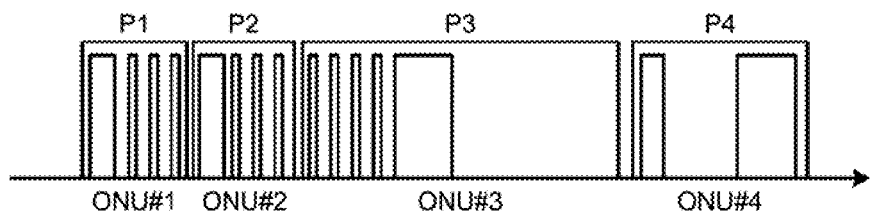
FIG. 6B is an explanatory diagram illustrating an example of accommodation statuses of radio signals per optical wavelength relating to the defragmenting process on the accommodation station.

After the center wavelength of the optical wavelength from the optical transmission unit 31A of the ONU 2 of #3 has been shifted, the first control unit 44 notifies the RRH 7A in the base station 7 of #3 connected to the ONU 2 of #3 of radio control information, in order to defragment radio signals in the optical wavelength of the ONU 2 of #3 in the low frequency direction. Based on the radio control information, the RRH 7A in the base station 7 of #3 shifts the radio signals in the optical wavelength of the ONU 2 of #3 to the low frequency side as illustrated in FIG. 6B. The accommodation status illustrated in FIG. 6B represents a state in which because the radio signals in the optical wavelength of the ONU 2 of #3 have been shifted to the low frequency side, there occurs a free band on the high frequency side in the optical wavelength of the ONU 2 of #3.

Figure 6C:
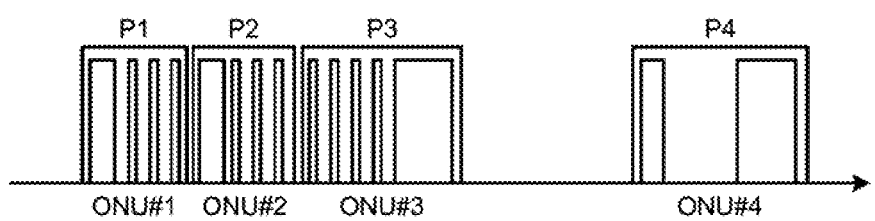
FIG. 6C is an explanatory diagram illustrating an example of accommodation statuses of radio signals per optical wavelength relating to the defragmenting process on the accommodation station.

The second control unit 45 adjusts the transmission band of the port P3 in the WSS 22 in order to defragment the optical wavelength of the ONU 2 of #3 in the short wavelength direction, that is, to remove the free band on the long wavelength side in the optical wavelength of the ONU 2 of #3. The WSS 22 adjusts the transmission band of the port P3, and transmits and outputs the optical wavelength of the ONU 2 of #3 from the port P3 as illustrated in FIG. 6C. The accommodation status illustrated in FIG. 6C represents a state in which because the free band on the long wavelength side in the optical wavelength of the ONU 2 of #3 has been removed, and the optical wavelength of the ONU 2 of #3 has been shifted to the short wavelength side, the optical wavelength of the ONU 2 of #3 is defragmented in the short wavelength direction. As a result, defragmentation of the optical wavelength of the ONU 2 of #3 is completed.

Figure 6D:
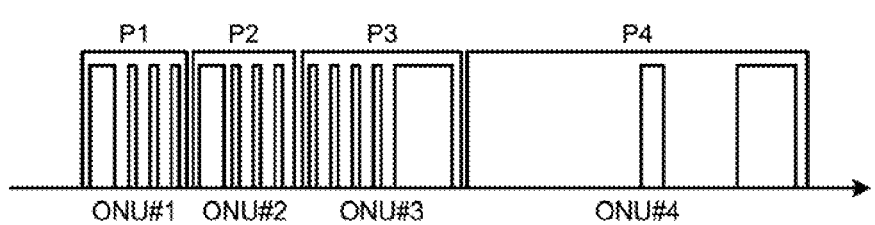
FIG. 6D is an explanatory diagram illustrating an example of accommodation statuses of radio signals per optical wavelength relating to the defragmenting process on the accommodation station.

After completion of defragmenting the optical wavelength of the ONU 2 of #3, the control unit 49 starts defragmenting the optical wavelength of the ONU 2 of #4 having the next shortest wavelength. The second control unit 45 determines whether there is a free band between the optical wavelength of the ONU 2 of #3 and the optical wavelength of the ONU 2 of #4, on the short wavelength side of the optical wavelength of the ONU 2 of #4. If there is a free band on the short wavelength side of the optical wavelength of the ONU 2 of #4, the second control unit 45 adjusts the transmission band of the port P4 in the WSS 22 so as to widen the band on the short wavelength side in the optical wavelength of the ONU 2 of #4 by a portion of the free band. It is assumed that the bandwidth of the optical wavelength of the ONU 2 of #4 obtained after band extension is set to such a degree that the band of the optical wavelength of the ONU 2 of #3 does not overlap. The WSS 22 adjusts the transmission band of the port P4, and transmits and outputs the optical wavelength of the ONU 2 of #4 from the port P4 as illustrated in FIG. 6D. The accommodation status illustrated in FIG. 6D represents a state in which the band on the short wavelength side in the optical wavelength of the ONU 2 of #4 has been extended to be close to the optical wavelength of the ONU 2 of #3.

Figure 7A:
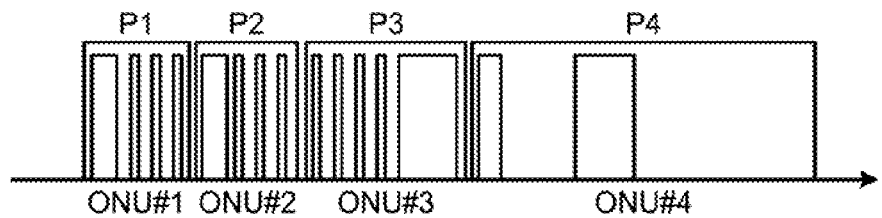
FIG. 7A is an explanatory diagram illustrating an example of accommodation statuses of radio signals per optical wavelength relating to the defragmenting process on the accommodation station.

The third control unit 47 notifies the optical transmission unit 31A of the ONU 2 of #4 of optical wavelength control information in order to shift the center wavelength of the optical wavelength transmitted by the optical transmission unit 31A of the ONU 2 of #4 to the center wavelength of the transmission band obtained after band adjustment of the port P4. Based on the optical wavelength control information, the optical transmission unit 31A in the ONU 2 of #4 shifts the center wavelength of the optical wavelength correspondingly to the center wavelength of the transmission band obtained after band extension, as illustrated in FIG. 7A. The accommodation status illustrated in FIG. 7A represents a state in which the center wavelength of the optical wavelength from the optical transmission unit 31A of the ONU 2 of #4 has been shifted to the center wavelength of the transmission band obtained after band extension of the port P4.

Figure 7B:
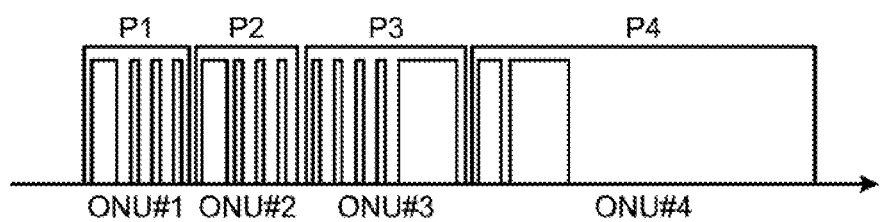
FIG. 7B is an explanatory diagram illustrating an example of accommodation statuses of radio signals per optical wavelength relating to the defragmenting process on the accommodation station.

After the center wavelength of the optical wavelength of the ONU 2 of #4 has been shifted, the first control unit 44 notifies the RRH 7A in the base station 7 of #4 connected to the ONU 2 of #4 of radio control information, in order to defragment radio signals in the optical wavelength of the ONU 2 of #4 in the low frequency direction. Based on the radio control information, the RRH 7A in the base station 7 of #4 shifts the radio signals in the optical wavelength of the ONU 2 of #4 to the low frequency side as illustrated in FIG. 7B. The accommodation status illustrated in FIG. 7B represents a state in which because the radio signals in the optical wavelength of the ONU 2 of #4 have been shifted to the low frequency side, there occurs a free band on the high frequency side in the optical wavelength of the ONU 2 of #4.

Figure 7C:
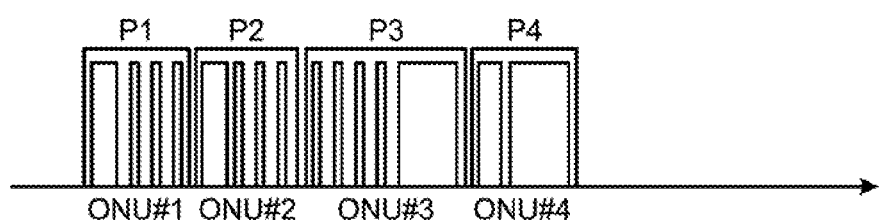
FIG. 7C is an explanatory diagram illustrating an example of accommodation statuses of radio signals per optical wavelength relating to the defragmenting process on the accommodation station.

The second control unit 45 adjusts the transmission band of the port P4 in the WSS 22 in order to defragment the optical wavelength of the ONU 2 of #4 in the short wavelength direction, that is, to remove the free band on the long wavelength side in the optical wavelength of the ONU 2 of #4. The WSS 22 adjusts the transmission band of the port P4, and transmits and outputs the optical wavelength of the ONU 2 of #4 from the port P4 as illustrated in FIG. 7C. The accommodation status illustrated in FIG. 7C represents a state in which because the free band on the long wavelength side in the optical wavelength of the ONU 2 of #4 has been removed, and the optical wavelength of the ONU 2 of #4 has been shifted to the short wavelength side, the optical wavelength of the ONU 2 of #4 is defragmented in the short wavelength direction. As a result, defragmentation of the optical wavelength of the ONU 2 of #4 is completed.

After completion of defragmenting the optical wavelength of the ONU 2 of #4, that is, when defragmentation of all the optical wavelengths is completed, the control unit 49 rearranges the optical wavelengths according to groups of the radio signals. It is assumed that the groups are obtained, for example, by grouping radio signals according to types of the radio signals, for example, by classifying them into a group of low-speed data and middle speed-data and a group of high-speed data. The control unit 49 controls the RRHs 7A of the base stations 7, the WSS 22, and the optical transmission units 31A in the ONUs 2, in order to assign radio signals of low-speed and middle-speed data in the optical wavelengths of #1, #2, and #3 to the optical wavelength of the port P1. Further, the control unit 49 controls the RRHs 7A of the base stations 7, the WSS 22, and the optical transmission units 31A in the ONUs 2, in order to assign high-speed radio signals in the optical wavelengths of #3 and #4 to the optical wavelength of the port P3. The second control unit 45 controls the WSS 22 so as to adjust the transmission band of the port P1 to allow the optical wavelength accommodating the radio signals of low-speed data from among the radio signals of the base station 7 of #1, the radio signals of the base station 7 of #2, and the radio signals of the base station 7 of #3, to be transmitted therethrough. The second control unit 45 controls the WSS 22 so as to adjust the transmission band of the port P3 to allow the optical wavelength accommodating the radio signals of high-speed data from the radio signals of the base station 7 of #4 and the radio signals of the base station 7 of #3, to be transmitted therethrough.

The third control unit 47 instructs the optical transmission unit 31A of the ONU 2 of #1 and the optical transmission unit 31A of the ONU 2 of #2 to shift to the optical wavelength corresponding to the port P1, and further instructs, regarding the radio signals of low-speed data, the optical transmission unit 31A of the ONU 2 of #3 to shift to the optical wavelength corresponding to the port P1. In addition, the third control unit 47 instructs the optical transmission unit 31A of the ONU 2 of #4 to shift to the optical wavelength corresponding to the port P3, and instructs, regarding the radio signals of high-speed data, the optical transmission unit 31A of the ONU 2 of #3 to shift to the optical wavelength corresponding to the port P3. In the accommodation status illustrated in FIG. 7D, the radio signals of the base station 7 of #1, the radio signals of the base station 7 of #2, the radio signals of the low-speed data of the base station 7 of #3 are accommodated in the optical wavelength which is a transmission output from the port P1. Further, in the accommodation status, the radio signals of the base station 7 of #4 and the radio signals of the high-speed data of the base station 7 of #3 are accommodated in the optical wavelength which is a transmission output from the port P3. Thus, because the optical communication units 21 handle the radio signals of similar types, it becomes possible to reduce the processing load of the signals.

Figure 8:
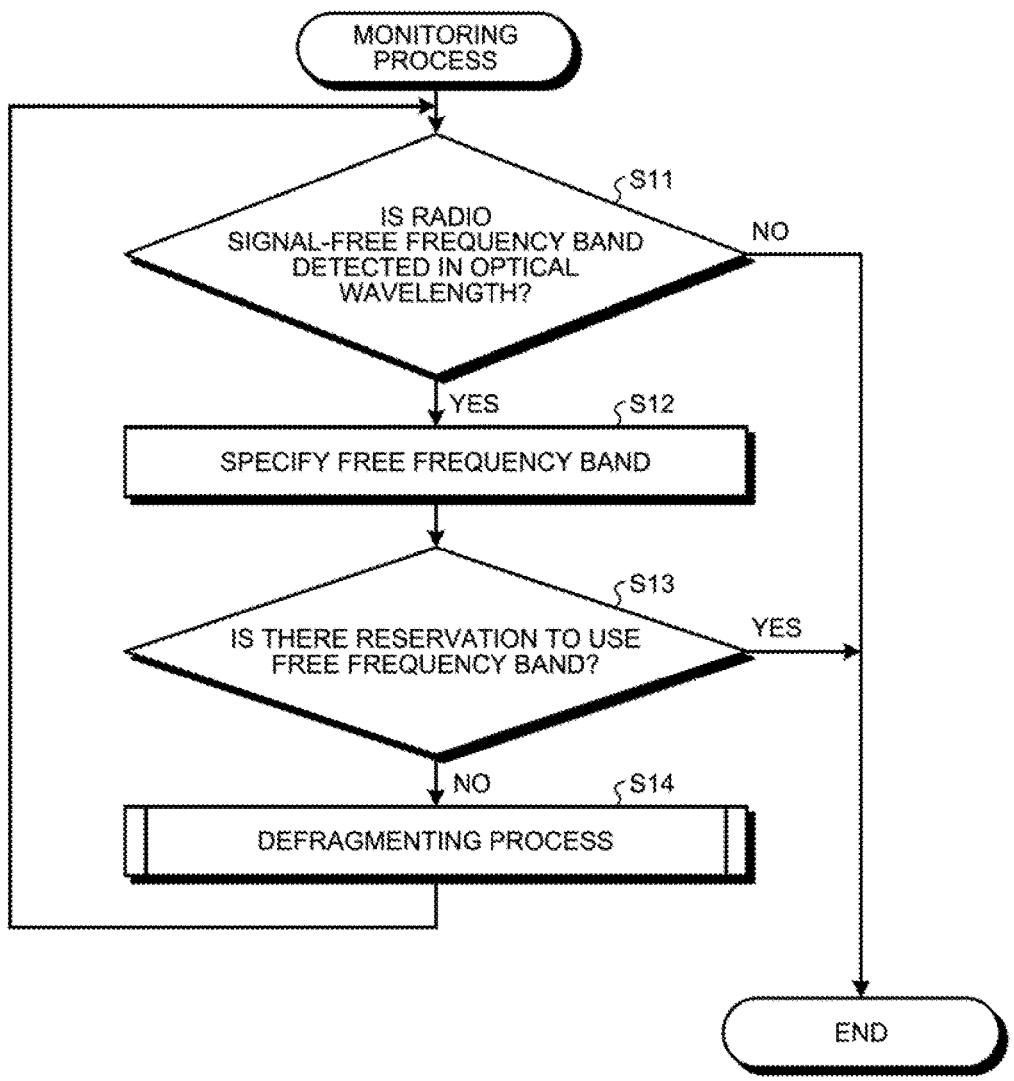
FIG. 8 is a flowchart illustrating an example of processing operations relating to a monitoring process in the controller of the accommodation station.

FIG. 8 is a flowchart illustrating an example of processing operations relating to a monitoring process in the controller 12 of the accommodation station 4. The monitoring process illustrated in FIG. 8 is a process to perform, when a radio signal-free frequency band is detected in an optical wavelength in an optical multiplexed signal, a defragmenting process according to the reservation status of the free frequency band.

In FIG. 8, based on the monitoring results by the radio frequency monitoring unit 42, the control unit 49 in the controller 12 determines whether a radio signal-free frequency band in the optical wavelength is detected (Step S11). When the free frequency band is detected (YES at Step S11), the control unit 49 identifies the free frequency band (Step S12). Further, the determination unit 49B in the control unit 49 refers to a reservation status in the radio management unit 43 which corresponds to the identified free frequency band, and determines whether there is a reservation to use the free frequency band (Step S13).

When there is no reservation to use the free frequency band (NO at Step S13), the control unit 49 performs defragmenting process illustrated in FIG. 9 (Step S14), and the process shifts to Step S11 in order to determine whether a radio signal-free frequency band is detected in the optical wavelength. When there is a reservation to use the free frequency band (YES at Step S13), the control unit 49 ends processing operations illustrated in FIG. 8 without performing a defragmenting process. The control unit 49 also ends processing operations illustrated in FIG. 8 when no free frequency band is detected (NO at Step S11).

The controller 12 performing a monitoring process illustrated in FIG. 8 detects a radio signal-free frequency band in the optical wavelength, and performs a defragmenting process when there is no reservation to use the free frequency band. As a result, the controller 12 can perform a defragmenting process while monitoring the use status of radio signals in the optical wavelength.

The controller 12 detects a radio signal-free frequency band in the optical wavelength, but does not perform a defragmenting process when there is a reservation to use the frequency band. As a result, the controller 12 can avoid unnecessary defragmentation because the free frequency band is used thereafter when there is a reservation to use the free frequency band in the optical wavelength.

FIG. 9 is a flowchart illustrating an example of processing operations relating to the defragmenting process in the controller 12. The defragmenting process illustrated in FIG. 9 is a process of defragmenting a radio signal-free band in an optical wavelength while performing the defragmenting process on the optical wavelength.

In FIG. 9, the specification unit 49A in the control unit 49 in the controller 12 specifies an optical wavelength having the shortest wavelength (Step S21). In the case of FIG. 4A, the optical wavelength having the shortest wavelength is the optical wavelength of the ONU 2 of #1 (port P1). The control unit 49 determines whether there is a free band on the short wavelength side of the specified optical wavelength (Step S22). The free band is a band in which the bandwidth of the specified optical wavelength can be extended to the short wavelength side. When, as illustrated in FIG. 4B, the optical wavelength of the port P1 is the shortest wavelength, it is determined that there is no free band.

When there is no free band on the short wavelength side of the specified optical wavelength (NO at Step S22), the first control unit 44 in the controller 12 specifies a radio signal in the specified optical wavelength (Step S23). In order to defragment the specified radio signal in the low frequency direction, the first control unit 44 notifies the RRH 7A of a corresponding base station 7 of radio control information that instructs shifting of a radio frequency of the specified radio signal (Step S24).

The first control unit 44 determines whether shifting of all the radio signals in the specified optical wavelength is completed (Step S25). When shifting of all the radio signals in the optical wavelength is not completed (NO at Step S25), the first control unit 44 specifies a next radio signal in the optical wavelength (Step S26), and the process shifts to Step S24 in order to defragment the specified radio signal in the low frequency direction.

When shifting of all the radio signals in the specified optical wavelength is completed (YES at Step S25), the control unit 49 determines whether there is a next optical wavelength to be specified (Step S27). When there is a next optical wavelength to be specified (YES at Step S27), the specification unit 49A in the control unit 49 specifies a next optical wavelength (Step S28), and the process shifts to Step S22 in order to determine whether there is a free band on the short wavelength side of the specified optical wavelength.

When, for example, as illustrated in the FIG. 5A, there is a free band on the short wavelength side of the specified optical wavelength (YES at Step S22), the second control unit 45 adjusts the transmission band of a corresponding port P in order to extend the transmission band of the optical wavelength to remove the free band on the short wavelength side (Step S29). For example, the second control unit 45 extends the transmission band of the port P2 to remove the free band on the short wavelength side of the optical wavelength of the ONU 2 of #2, as illustrated in FIG. 5B.

The third control unit 47 notifies the optical transmission unit 31A on the ONU 2 side of optical wavelength control information in order to shift the center wavelength of the optical wavelength passing through the transmission band obtained after band extension to the center wavelength of the transmission band obtained after the band extension (Step S30). For example, the third control unit 47 shifts the center wavelength of the optical wavelength of the optical transmission unit 31A of the ONU 2 of #2 to the center wavelength of the transmission band obtained after band extension of the port P2, as illustrated in FIG. 5C. The first control unit 44 specifies radio signals in the specified optical wavelength (Step S31). In order to defragment the specified radio signals in the low frequency direction, the first control unit 44 notifies the RRH 7A of the corresponding base station 7 of radio control information instructing shifting of radio frequencies of the specified radio signals (Step S32).

The first control unit 44 determines whether shifting of all the radio signals in the specified optical wavelength is completed (Step S33). When shifting of all the radio signals in the optical wavelength is not completed (NO at Step S33), the first control unit 44 specifies a next radio signal in the optical wavelength (Step S34), and the process shifts to Step S32 in order to defragment the specified radio signal in the low frequency direction. As a result, the first control unit 44 completes shifting of all the radio signals in the optical wavelength of the ONU 2 of #2 to the low frequency side, for example, as illustrated in FIG. 5D.

When shifting of all the radio signals in the specified optical wavelength is completed (YES at Step S33), the second control unit 45 adjusts the transmission band of the port P of the optical wavelength so as to remove a free band in the bandwidth in the specified optical wavelength (Step S35). Further, the control unit 49 determines whether defragmentation of all the optical wavelengths is completed (Step S36). When defragmentation of all the optical wavelengths is not completed (NO at Step S36), the process shifts to Step S28 in order to specify a next optical wavelength.

Figure 7D:
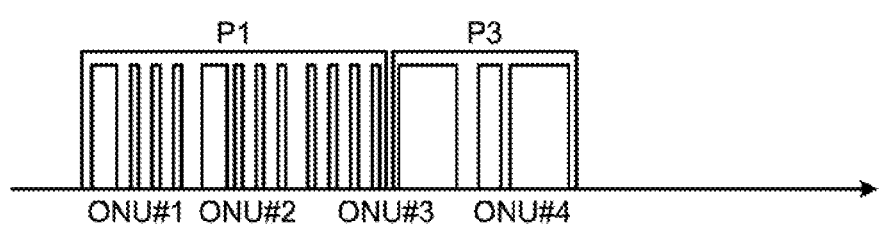
FIG. 7D is an explanatory diagram illustrating an example of accommodation statuses of radio signals per optical wavelength relating to the defragmenting process on the accommodation station.

When defragmentation of all the optical wavelengths is completed (YES at Step S36), the control unit 49 determines whether the ports P of the WSS 22 can be rearranged (Step S37). When defragmentation of all the optical wavelengths is completed, for example, the accommodation state illustrated in FIG. 7C is obtained. When the ports P of the WSS 22 can be rearranged (YES at Step S37), the control unit 49 controls the WSS 22 and the like so as to rearrange the ports as illustrated in FIG. 7D (Step S38), and ends processing operations illustrated in FIG. 9. When it is difficult for the ports P of the WSS 22 to be rearranged (NO at Step S37), the control unit 49 also ends processing operations illustrated in FIG. 9.

The controller 12 shifts the radio signals in the specified optical wavelength to the low frequency side, and shifts the optical wavelength to the short wavelength side, in order to remove the free band obtained by shifting the radio signals in the specified optical wavelength. The controller 12 then sequentially repeats shifting radio signals and optical wavelengths, thereby sequentially defragmenting the radio signals and the optical wavelengths. As a result, the controller 12 performs defragmentation on the radio signals and the optical wavelengths according to the use status of the radio signals in the optical wavelengths, thereby increasing the transport efficiency of the optical wavelengths.

The accommodation station 4 according to the first embodiment controls the RRH 7A of the base station 7 on the ONU 2 side so as to shift radio signals in a specified optical wavelength to the low frequency side. The accommodation station 4 further controls the WSS 22 each time upon shifting of the radio signals in the optical wavelength, in order to shift the optical wavelengths to the short wavelength side in a free band obtained by shifting the radio signals. As a result, because the accommodation station 4 defragments the radio signals in the optical wavelengths and defragments the optical wavelengths in the free band obtained from the defragmentation, the utilization ratio of the radio signal and optical wavelength resources is increased, thereby improving the transport efficiency of the optical wavelengths. Further, while the bandwidth of the optical wavelength used when the load is high is ensured, the bandwidth of the optical wavelength is shortened when the load is low, and therefore, it is possible to suppress power consumption in corresponding optical communication units 21 and 31. Because it is possible to shift the radio frequencies and the optical wavelengths in association with each other according to the status of a radio signal-free space, it is possible to save power consumption in the optical communication units 21 and 31 when the load is low.

If there is a free band on the low wavelength side of an optical wavelength, the accommodation station 4 extends the bandwidth of the optical wavelength by a portion of the free band on the low wavelength side, and controls the optical transmission unit 31A on the ONU 2 side so as to shift the center wavelength of the optical wavelength obtained after band extension to the center wavelength of the optical wavelength transmitted by the optical transmission unit 31A on the ONU 2 side. The accommodation station 4 further defragments the radio signals in the optical wavelength obtained after shifting of the center wavelength, and controls the WSS 22 so as to transmit and output the optical wavelength obtained after radio signal defragmentation. As a result, the accommodation station 4 sequentially defragments the optical wavelengths, thereby improving the transport efficiency of the optical wavelengths.

After completion of defragmentation per optical wavelength in the optical multiplexed signal, the accommodation station 4 assigns optical wavelengths to respective groups of radio signals, in accordance with the groups of radio signals, and controls the WSS 22 so as to adjust the transmission bands of the ports P through which the assigned optical wavelengths are transmitted. In other words, after defragmentation of the optical wavelengths, the accommodation station 4 rearranges the optical wavelengths according to the groups of radio signals. As a result, the accommodation station 4 assigns the optical wavelengths according to the groups of radio signals, and, therefore, it is possible to process the radio signals in each group per optical wavelength, thereby reducing the processing load needed for the signal processing.

Upon detecting a radio signal-free frequency band in the optical wavelength in the optical multiplexed signal, the accommodation station 4 determines whether a defragmenting process can be performed based on the reservation status of the free frequency band. More specifically, when the free frequency band is reserved, the accommodation station 4 does not perform the defragmenting process, and when the free frequency band is not reserved, the accommodation station 4 performs the defragmenting process. As a result, it is possible to avoid an unnecessary defragmenting process when the free frequency band is reserved.

In the optical transport system 1 according to the first embodiment, there has been exemplified a case where, for example, the base station 7 of #1, the base station 7 of #2, the base station 7 of #3, and the base station 7 of #4 are located in areas that are geographically close. However, it is also possible to adopt a case where the base station 7 of #1, the base station 7 of #2, and the base station 7 of #3 are located in adjacent areas, for example, in a city, and the base station 7 of #4 and the base station 7 of #5 are located in adjacent areas in a suburb far from the city, and an embodiment in this case is explained below as a second embodiment.

[a] Second Embodiment

FIGS. 10A to 10C and FIGS. 11A to 11C are explanatory diagrams respectively illustrating an example of accommodation statuses of radio signals per optical wavelength relating to a defragmenting process on the accommodation station 4 according to a second embodiment. Constituent elements identical to those of the optical transport system 1 according to the first embodiment are denoted by like reference signs and redundant explanations of configurations and operations thereof will be omitted.

Figure 10A:
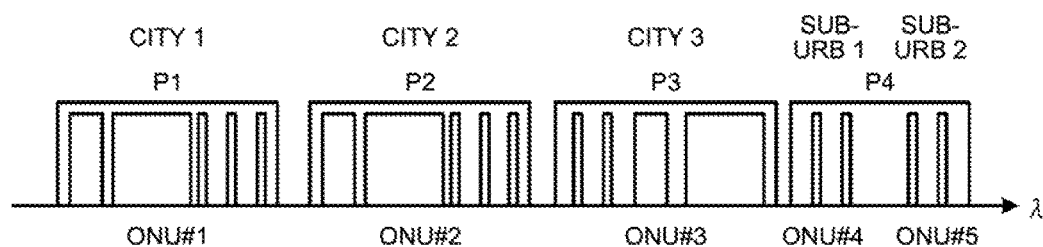
FIG. 10A is an explanatory diagram illustrating an example of accommodation statuses of radio signals per optical wavelength relating to a defragmenting process on an accommodation station according to a second embodiment.

In the accommodation status in FIG. 10A, an optical wavelength of the ONU 2 of #1, an optical wavelength of the ONU 2 of #2, an optical wavelength of the ONU 2 of #3, an optical wavelength of the ONU 2 of #4, and an optical wavelength of the ONU 2 of #5 are accommodated. The optical wavelength of the ONU 2 of #1 accommodates radio signals of the base station 7 of #1. The optical wavelength of the ONU 2 of #2 accommodates radio signals of the base station 7 of #2. The optical wavelength of the ONU 2 of #3 accommodates radio signals of the base station 7 of #3. The optical wavelength of the ONU 2 of #4 accommodates radio signals of the base station 7 of #4. The optical wavelength of the ONU 2 of #5 accommodates radio signals of the base station 7 of #5. It is assumed that the base stations 7 of #1, #2, and #3 are located in adjacent areas in a city, and that the base stations 7 of #4 and #5 are located in adjacent areas in a suburb. It is assumed that, in the daytime, the radio traffic volume in the base stations 7 of #1, #2, and #3 in the city area is high, while the radio traffic volume in the base stations 7 of #4 and #5 in the suburb is less than that of the city area.

Figure 10B:
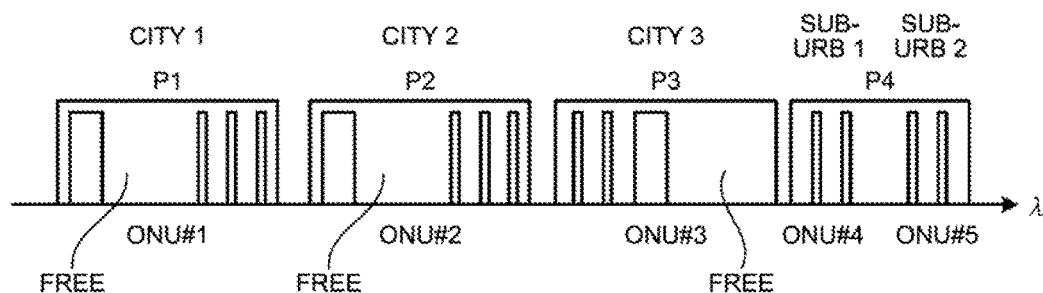
FIG. 10B is an explanatory diagram illustrating an example of accommodation statuses of radio signals per optical wavelength relating to the defragmenting process on the accommodation station according to the second embodiment.
Figure 10C:
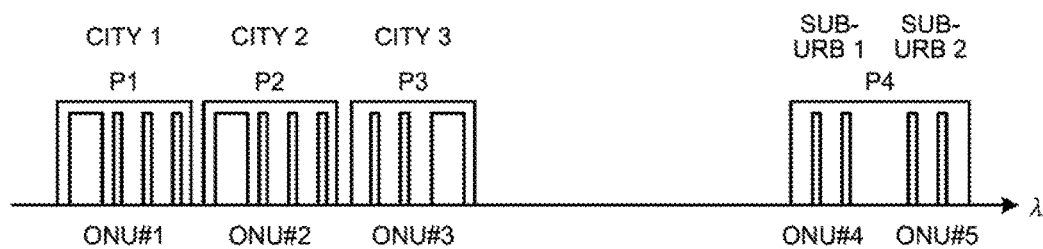
FIG. 10C is an explanatory diagram illustrating an example of accommodation statuses of radio signals per optical wavelength relating to the defragmenting process on the accommodation station according to the second embodiment.

As time for workers to go home approaches, the radio traffic volume in the base stations 7 of #1, #2, and #3 in the city area is gradually reduced as illustrated in FIG. 10B. When the control unit 49 detects reduction in the radio traffic volume in the base stations 7 of #1, #2, and #3 in the city area, that is, when the control unit 49 detects radio signal-free frequency bands in the optical wavelengths, the control unit 49 defragments the optical wavelengths of the ONUS of #1, #2, and #3 as illustrated in FIG. 10C. More specifically, the control unit 49 defragments radio signals of the base station 7 of #1 in the optical wavelength of the ONU 2 of #1, and defragments the optical wavelength of the ONU 2 of #1. The control unit 49 also defragments radio signals of the base station 7 of #2 in the optical wavelength of the ONU 2 of #2, and subsequently defragments the optical wavelength of the ONU 2 of #2. The control unit 49 further defragments radio signals of the base station 7 of #3 in the optical wavelength of the ONU 2 of #3, and subsequently defragments the optical wavelength of the ONU 2 of #3. As a result, the control unit 49 completes defragmentation of the optical wavelengths of the ONUS 2 of #1, #2, and #3.

Figure 11A:
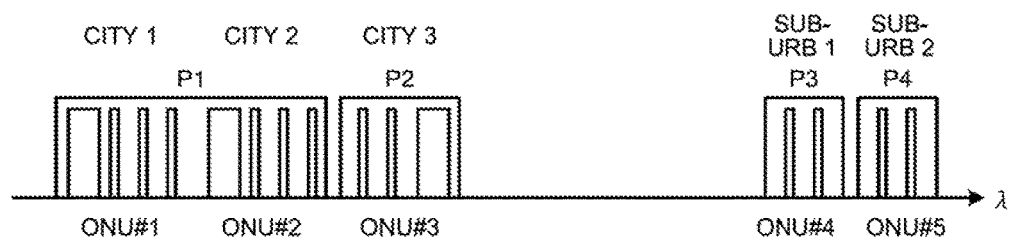
FIG. 11A is an explanatory diagram illustrating an example of accommodation statuses of radio signals per optical wavelength relating to the defragmenting process on the accommodation station according to the second embodiment.

After defragmentation of the optical wavelengths of the ONUS 2 of #1, #2, and #3, the control unit 49 further anticipates a rise in radio traffic volume in the base stations 7 of #4 and #5 located in the suburb, and rearranges the optical wavelengths to be assigned to the base stations 7 of #1, #2, #3, #4, and #5. As illustrated in FIG. 11A, the control unit 49 assigns the radio signals of the base stations 7 of #1 and #2 to the optical wavelength of the port P1, the radio signals of the base station 7 of #3 to the optical wavelength of the port P2, the radio signals of the base station 7 of #4 to the optical wavelength of the port P3, and the radio signals of the base station 7 of #5 to the optical wavelength of the port P4.

Figure 11B:
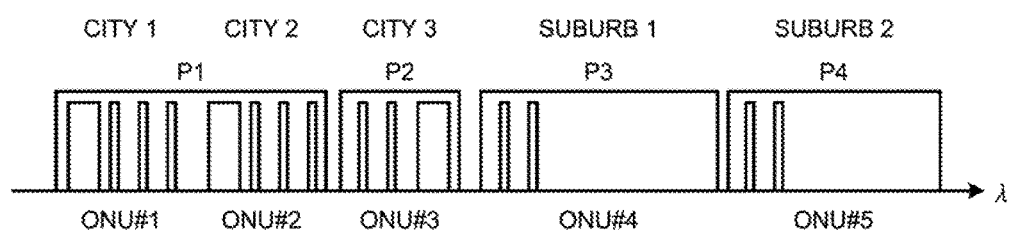
FIG. 11B is an explanatory diagram illustrating an example of accommodation statuses of radio signals per optical wavelength relating to the defragmenting process on the accommodation station according to the second embodiment.

The control unit 49 further anticipates a rise in radio traffic volume in the base stations 7 of #4 and #5 in the suburb, and adjusts the transmission bands of the ports P3 and P4 so as to widen the bandwidths of the optical wavelengths assigned to the base stations 7 of #4 and #5 as illustrated in FIG. 11B. As a result, because the control unit 49 extends the transmission bands of the optical wavelengths of the port P3 and the port P4 in order to widen the bandwidths of the optical wavelengths, and thus a rise in radio traffic volume in the base stations 7 of #4 and #5 can be handled.

Figure 11C:
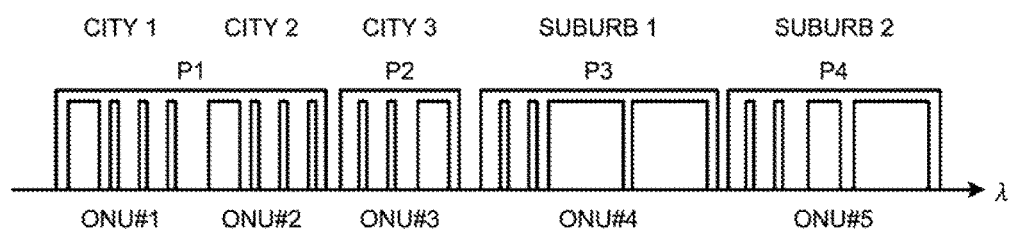
FIG. 11C is an explanatory diagram illustrating an example of accommodation statuses of radio signals per optical wavelength relating to the defragmenting process on the accommodation station according to the second embodiment.

Furthermore, even when the traffic volume in the base stations 7 of #4 and #5 actually rises, the bandwidths of the optical wavelengths assigned to the base stations 7 of #4 and #5 have been widened. As a result, as illustrated in FIG. 11C, the control unit 49 can transport radio signals of the base station 7 of #4 and radio signals of the base station 7 of #5 respectively in the transmission band of the port P3 and the transmission band of the port P4.

Because, in the optical transport system 1 according to the second embodiment, the optical wavelengths have been rearranged according to the changes in the radio traffic volume in the city and the suburb, it is possible to improve the transport efficiency of the optical wavelengths, while flexibly responding to the changes in the radio traffic volume in the city and the suburb.

In the above-described first embodiment, when, for example, there is a free band on the short wavelength side in the optical wavelength of the ONU 2 of #2, after the band of the optical wavelength is extended by a portion of the free band on the short wavelength side of the optical wavelength, the center wavelength of the optical wavelength of the ONU 2 of #2 is shifted to the center wavelength of the optical wavelength obtained after band extension. Further, radio signals in the optical wavelength obtained after shifting of the center wavelength are shifted to the low frequency side, and the optical wavelengths obtained after shifting of the radio signals are shifted to the low wavelength side. However, the method is not limited to the processing method, and the methods in FIGS. 12A to 12D can be used.

Figure 12A:
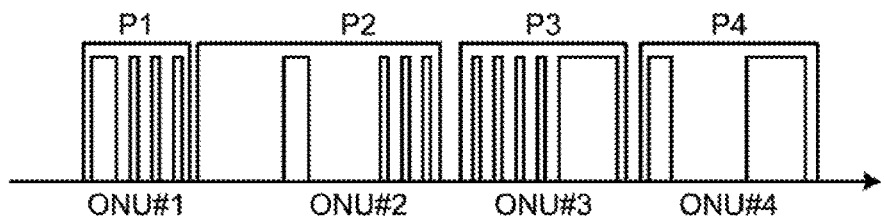
FIG. 12A is an explanatory diagram illustrating an example of accommodation statuses of radio signals per optical wavelength relating to a defragmenting process on an accommodation station according to another embodiment.

After defragmentation of the optical wavelength of the ONU 2 of #1, the control unit 49 starts defragmenting the optical wavelength of the ONU 2 of #2 having the next shortest wavelength. When there is a free band on the short wavelength side of the optical wavelength of the ONU 2 of #2, the second control unit 45 adjusts the transmission band of the port P2 in the WSS 22 so as to widen the band on the short wavelength side in the optical wavelength of the ONU 2 of #2 by a portion of the free band. It is assumed that the bandwidth of the optical wavelength of the ONU 2 of #2 obtained after band extension is set to such a degree that the band of the optical wavelength of the ONU 2 of #1 does not overlap. The WSS adjusts the transmission band of the port P2, and transmits and outputs the optical wavelength of the ONU 2 of #2 from the port P2 as illustrated in FIG. 12A. The accommodation status illustrated in FIG. 12A represents a state in which the band on the short wavelength side in the optical wavelength of the ONU 2 of #2 is extended to be close to the optical wavelength of the ONU 2 of #1.

Figure 12B:
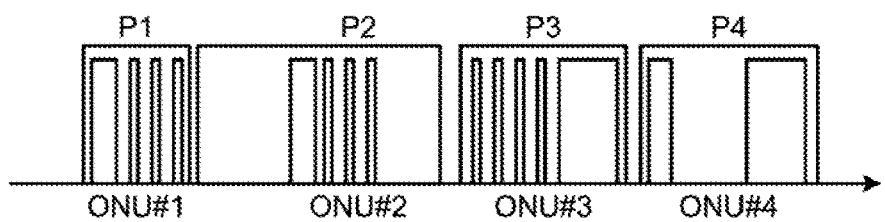
FIG. 12B is an explanatory diagram illustrating an example of accommodation statuses of radio signals per optical wavelength relating to the defragmenting process on the accommodation station according to another embodiment.

The first control unit 44 notifies the RRH 7A in the base station 7 of #2 connected to the ONU 2 of #2 of radio control information in order to defragment radio signals in the optical wavelength of the ONU 2 of #2 to the low frequency direction. Based on the radio control information, the RRH 7A in the base station 7 of #2 shifts the radio signals in the optical wavelength of the ONU 2 of #2 as illustrated in FIG. 12B. The accommodation status illustrated in FIG. 12B represents a state in which because the radio signals in the optical wavelength of the ONU 2 of #2 have been shifted, there occurs a free band on the high frequency side in the optical wavelength of the ONU 2 of #2.

Figure 12C:
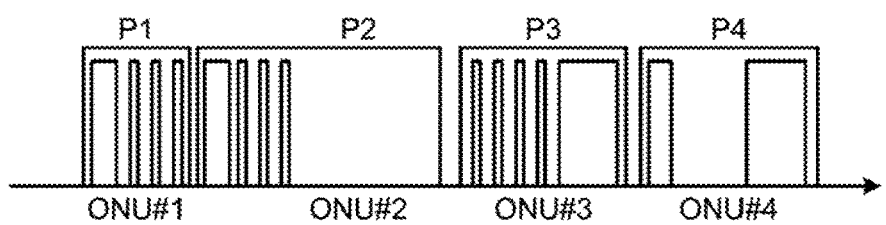
FIG. 12C is an explanatory diagram illustrating an example of accommodation statuses of radio signals per optical wavelength relating to the defragmenting process on the accommodation station according to another embodiment.

After defragmentation of the radio signals in the optical wavelength of the ONU 2 of #2, the third control unit 47 notifies the ONU 2 of #2 of optical wavelength control information, in order to shift the center wavelength of the optical wavelength transmitted by the optical transmission unit 31A of the ONU 2 of #2 to the center wavelength of the transmission band obtained after band extension of the port P2. Based on the optical wavelength control information, the optical transmission unit 31A in the ONU 2 of #2 shifts the center wavelength of the optical wavelength correspondingly to the center wavelength of the transmission band obtained after band expansion as illustrated in FIG. 12C. The accommodation status illustrated in FIG. 12C represents a state in which the center wavelength of the optical wavelength from the optical transmission unit 31A of the ONU 2 of #2 has been shifted to the center wavelength of the transmission band obtained after band expansion of the port P2.

Figure 12D:
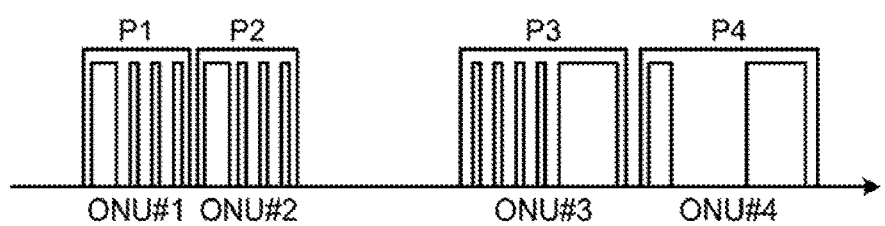
FIG. 12D is an explanatory diagram illustrating an example of accommodation statuses of radio signals per optical wavelength relating to the defragmenting process on the accommodation station according to another embodiment.

The second control unit 45 adjusts the transmission band of the port P2 in the WSS 22 so as to defragment the optical wavelength of the ONU 2 of #2 in the short wavelength direction, that is, to remove the free band on the long wavelength side in the optical wavelength of the ONU 2 of #2. The WSS 22 adjusts the transmission band of the port P2, and transmits and outputs the optical wavelength of the ONU 2 of #2 as illustrated in FIG. 12D. The accommodation status illustrated in FIG. 12D represents a state in which because the free band on the long wavelength side in the optical wavelength of the ONU 2 of #2 has been removed, and the optical wavelength of the ONU 2 of #2 has been shifted to the short wavelength side, the optical wavelength of the ONU 2 of #2 is defragmented in the short wavelength direction. As a result, defragmentation of the optical wavelength of the ONU 2 of #2 is completed. More specifically, after the band of the optical wavelength is extended by a portion of the free band on the low wavelength side of the optical wavelength, the radio signals in the optical wavelength obtained after band extension are defragmented. After the radio signal are defragmented, the center wavelength of the optical wavelength on the optical transmission unit 31A side on the ONU 2 side is shifted to the center wavelength of the optical wavelength obtained after band extension. Further, it is also possible to defragment the optical wavelength even when the optical wavelength obtained after shifting of the center wavelength of the optical wavelength is defragmented.

In the above embodiments, as a method of notifying the RRH 7A of radio control information, there has been exemplified a case where the radio control information is arranged in a header portion in an optical multiplexed signal. However, the notification method may include, such as, for example, a case of superimposing radio control information on an optical multiplexed signal and a method of notifying radio control information through a control line between the controller 12 and the RRH 7A, and thus the method can be changed as appropriate.

In the above embodiments, as a method of notifying the optical communication unit 31 of optical wavelength control information, there has been exemplified a case where the optical wavelength control information is arranged in a header portion in an optical multiplexed signal. However, the notification method may include, such as, for example, a case of superimposing optical wavelength control information on an optical multiplexed signal and a method of notifying optical wavelength control information through a control line between the controller 12 and the optical communication unit 31, and thus the method can be changed as appropriate.

Although, in the above embodiments, rearrangement of the optical wavelengths has been performed after completion of defragmentation of optical wavelengths, rearrangement of the optical wavelengths does not necessarily have to be performed.

In the above embodiments, in rearrangement of the optical wavelengths performed after completion of defragmentation of the optical wavelengths, the optical wavelengths have been rearranged according to groups of radio signals. Radio signals of the low-speed data and the middle-speed data are grouped in the same group. However, the low-speed data and the middle-speed data may be grouped in different groups, and the constitution of groups can be changed as appropriate.

In the above embodiments, there has been exemplified a case where the direction to defragment radio signals is shifted to the low frequency side, and the direction to defragment the optical wavelength is shifted to the short wavelength side. However, the directions for defragmenting the radio signals and the optical wavelengths are not limited to these directions, and can be changed as appropriate.

The direction to defragment the radio signals may be shifted to the low frequency side or the high frequency side depending on a space of an unused frequency band, and by shifting the direction to a direction in which the number of radio signals that are being used is smaller, it is possible to reduce the processing load needed for shifting the radio signals.

Further, as the direction to defragment the optical wavelengths, it is also possible to adopt a shifting direction to concentrate the optical wavelengths on the long wavelength side, a shifting direction to concentrate the optical wavelengths to both ends of the long wavelength side and the short wavelength side, and a shifting direction to concentrate the optical wavelengths in a middle band, with spaces left on the bands on the short wavelength side and the long wavelength side. The shifting direction can be also determined assuming a case where it is desired to maintain the high quality of signals to be used or a case where it is desired to maintain the high quality of signals to be assigned later.

In addition, the signal quality according to an OSNR (Optical Signal to Noise Ratio) becomes higher on the long wavelength side than the short wavelength side. When it is desired to maintain the high quality of signals that are being used, it is possible to ensure transport with the high signal quality by performing shifting signals so as to be concentrated on the long wavelength side.

When shifting is performed so as to leave spaces in the band on the short wavelength side and in the band on the long wavelength side to concentrate radio signals in the middle band, in the middle wavelength between the short wavelength and the long wavelength, power of optical signals becomes highly uniform with less dependence on wavelength. As a result, it is possible to obtain uniform power between wavelengths and between radio signals.

Respective constituent elements of respective units illustrated in the drawings do not necessarily have to be physically configured in the way as illustrated in these drawings. That is, the specific mode of distribution and integration of respective units is not limited to the illustrated ones and all or a part of these units can be functionally or physically distributed or integrated in an arbitrary unit, according to various kinds of load and the status of use.

Furthermore, all or an arbitrary part of each processing function performed by respective devices can be realized by a CPU (Central Processing Unit) (or a microcomputer such as an MPU (Micro Processing Unit) and an MCU (Micro Controller Unit)). Further, all or an arbitrary part of the respective processing function can be realized by a program analyzed and executed in the CPU (or a microcomputer such as an MPU and an MCU), or realized as hardware by a wired logic.

As one aspect, improvement in the transport efficiency of a radio signal and an optical wavelength is made.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transport apparatus transporting an optical multiplexed signal accommodating a radio signal per optical wavelength, the optical transport apparatus comprising a processor configured to:

transport an optical multiplexed signal between the optical transport apparatus and a counterpart apparatus by using a plurality of communication units;

transmit an arbitrary optical wavelength from the optical multiplexed signal passing through ports by using a wavelength selective switch that has the ports respectively connected to the communication units;

control a radio unit in the counterpart apparatus so as to change a frequency of the radio signal in the specified optical wavelength;

change a transmission band of the port through which the optical wavelength passes, according to a change of the frequency of the radio signal; and control an optical transmission unit of the counterpart apparatus so as to change a center wavelength of an optical wavelength passing through the port to a center wavelength of the changed transmission band of the port.

2. The optical transport apparatus according to claim 1, wherein the processor is further configured to:

after a transmission band of the port of the specified optical wavelength is changed so as to extend a bandwidth of the optical wavelength by a portion of a free band in a changing direction, change the center wavelength of the optical wavelength passing through the transmission band obtained after an extension change to the center wavelength of the transmission band obtained after the extension change;

after changing the center wavelength of the optical wavelength, change a frequency of the radio signal in the optical wavelength obtained after the center wavelength change; and after changing a frequency of the radio signal in the optical wavelength obtained after the center wavelength change, change the transmission band of the port through which the optical wavelength passes.

3. The optical transport apparatus according to claim 1, wherein the processor is further configured to:

after a transmission band of a port of the specified optical wavelength is changed so as to extend a bandwidth of the optical wavelength by a portion of a free band in a changing direction, change a frequency of the radio signal in the optical wavelength passed through the transmission band obtained after the extension change;

after changing a frequency of the radio signal in the optical wavelength passed through the transmission band obtained after the extension change, change a center wavelength of the optical wavelength passing through the transmission band to a center wavelength of the transmission band obtained after the extension change; and after changing a center wavelength of the optical wavelength, change a transmission band of the port through which the optical wavelength passes.

4. The optical transport apparatus according to claim 1, wherein the processor is further configured to:
  after change of a center wavelength per optical wavelength in the optical multiplexed signal is completed, assign the optical wavelength according to a group of the radio signals;
  accommodate the radio signals of the group in the assigned optical wavelength;
  change a transmission band of a port passing through the optical wavelength.

5. The optical transport apparatus according to claim 1, wherein the processor is further configured to:
  when a radio signal-free frequency is detected in the optical wavelength in the optical multiplexed signal, determine whether it is possible to change a center wavelength for each of the optical wavelengths, based on a reservation status of the radio signal-free frequency.

6. A defragmenting method of an optical wavelength of an optical transport apparatus including:
  ports respectively connected to the communication units transporting an optical multiplexed signal between the optical transport apparatus and a counterpart apparatus, in order to transmit the optical multiplexed signal accommodating radio signals per optical wavelength; and
  a wavelength selective switch that transmits an arbitrary optical wavelength from the optical multiplexed signal passing through the ports, the method comprising:
  changing, by a processor of the optical transport apparatus, a frequency of the radio signal in the specified optical wavelength;
  changing, by the processor, a transmission band of the port through which the optical wavelength passes, according to a change of the frequency of the radio signal; and
  changing, by the processor, a center wavelength of an optical wavelength passing through the port to a center wavelength of the changed transmission band of the port.

* * * * *